Feb. 18, 1964 L. N. RIDENOUR, JR., ETAL 3,121,862

MAGNETIC MEMORY SYSTEM

Filed April 25, 1958 2 Sheets-Sheet 1

INVENTORS
LOUIS N. RIDENOUR JR.
ROBERT L. KOPPEL

By George C. Sullivan
Agent

INVENTORS
LOUIS N. RIDENOUR JR.
ROBERT L. KOPPEL
By George C. Sullivan
Agent

United States Patent Office 3,121,862
Patented Feb. 18, 1964

3,121,862
MAGNETIC MEMORY SYSTEM
Louis N. Ridenour, Jr., Palo Alto, and Robert L. Koppel, Sunnyvale, Calif., assignors to Lockheed Aircraft Corporation, Burbank, Calif.
Filed Apr. 25, 1958, Ser. No. 730,904
4 Claims. (Cl. 340—174)

The present invention relates to a magnetic memory system, and more particularly to an improved coincident current memory system.

Coincident current memory systems are used extensively in computers for storage of digital information. In many instances, the memory system is operated by applying a pair of coincident current pulses to a selected memory element which shifts the memory element from one residual state to another. Preferably, an individual current pulse is insufficient to shift the residual state of a memory element and coincidence of at least two pulses on the same memory element would be required to shift state of the element.

In one form of the invention the memory system includes an array of magnetic cores arranged in a matrix in which two or more coordinate input circuits are inductively coupled to each core in the array. Preferably, a pair of rows and a column of cores in the matrix are coupled to respective coordinate input circuits. Coincident current pulses applied to the coordinate input circuits which are coupled to a respective column and pair of rows, are capable of shifting the residual magnetic state of a pair of cores forming a memory cell. One or both of the cores at the intersection of the input circuits will be shifted by a M.M.F. produced by coincident pulses in the absence of: (1) a coincident inhibiting pulse or (2) a high impedance gate in the input circuit preventing the application of the coincident pulses to the windings of a core in a cell. Also in the preferred arrangement only one input pulse does not have a sufficient current amplitude in itself to induce a magnetomotive force (M.M.F.) for shifting the residual state of magnetism of a core. However, coincident current pulses coupled to windings on the same core will shift the residual state of magnetism in the absence of the forementioned high impedance gate or a coincident inhibiting pulse.

An object of the present invention is the provision of an improved coincident current memory system.

Another object is to provide a magnetic core memory system for trinary digital storage.

Another object is to provide a memory system having an improved signal to noise ratio.

A further object of the invention is the provision of a magnetic memory system having a pair of cores forming a memory cell for each bit of information or digit wherein coincident current pulses shift the state of residual magnetism of at least one core in the memory cell.

Still another object is to provide a memory system for selectively detecting changes in the state of residual magnetism of alternate series of magnetic cores.

A further object of the invention is the provision of coincident input and inhibiting signals for selectively shifting the magnet cores in the memory cells.

Another object is to provide a memory system in which there is an output signal for all digits being read.

Still another object is the provision of a magnetic core memory system having the same number of cores in each line.

Other objects and advantages of the invention will hereinafter become fully apparent from the following detailed description of the annexed drawings, which illustrate a preferred embodiment and wherein.

Figure 1:
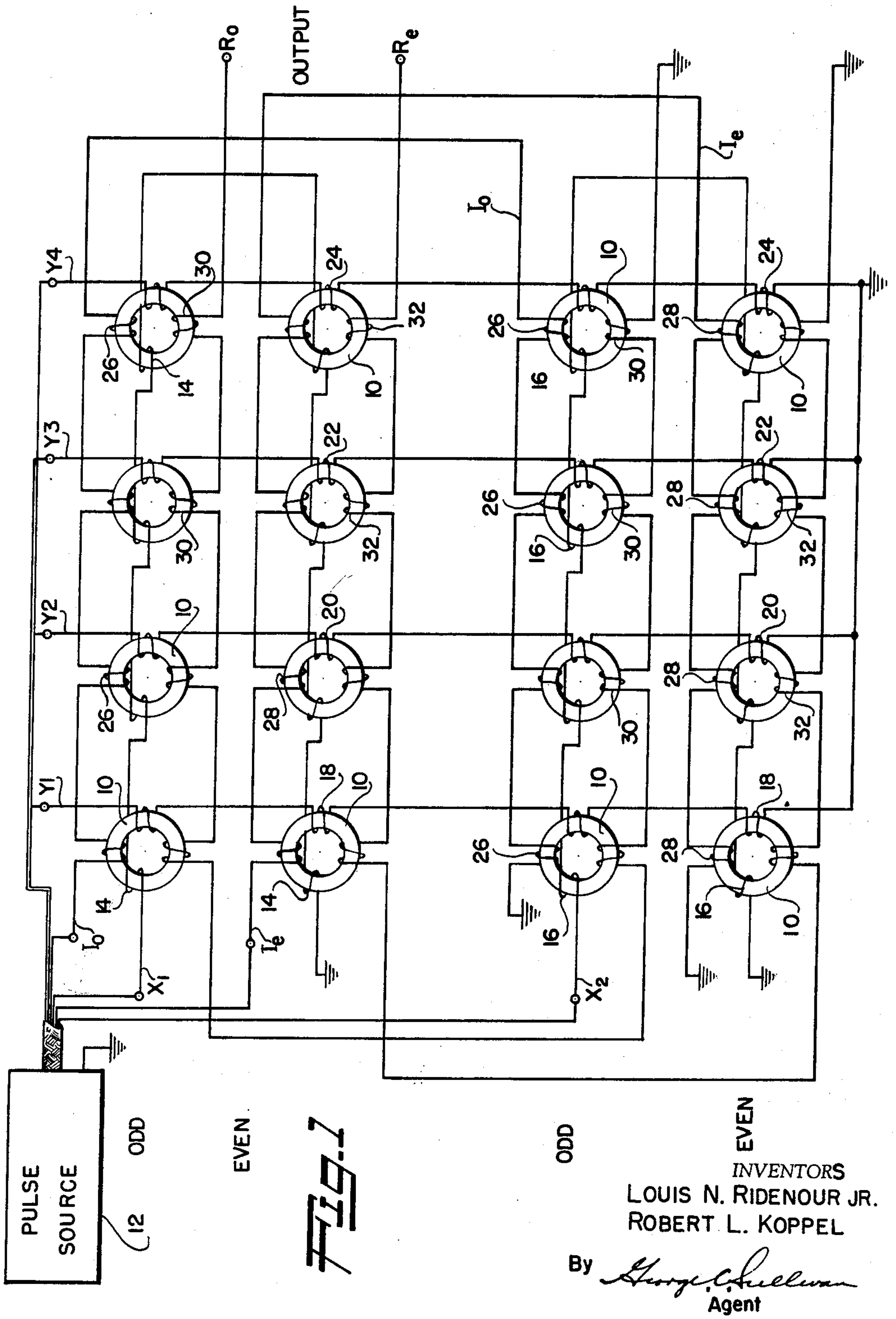
FIGURE 1 is a schematic diagram of a preferred embodiment of the invention.

Referring now to the drawings, wherein like reference characters designate like or corresponding parts through the several views, there is shown in FIGURE 1, which illustrates a preferred embodiment, a memory system including an array of magnetic cores 10 forming a matrix. The memory system as shown, employs a pair of cores in each memory cell or two cores per bit of information. As shown, the matrix has two memory cells per column and four columns, however it is understood that the drawing is illustrative and the matrix may be larger or smaller.

A pulse source 12, e.g., regulated driver voltage source is selectively coupled to the cores 10 in the matrix by the input circuits or lines X1 and X2; Y1, Y2, Y3, Y4 and additional or inhibitory circuits or lines $I_o$ and $I_e$. The input circuit X1 is coupled to each magnetic core in the top two rows of the matrix by windings 14 whereby a current pulse on the input circuit X1 will induce an M.M.F. in each of the cores 10 in the same direction. Input circuit or line X2 is coupled to the cores 10 in the bottom rows by the individual line windings 16.

Each of the input circuits or lines Y1, Y2, Y3 and Y4 is coupled to a separate column of cores by the windings 18, 20, 22 and 24 respectively, whereby the selective application of an input pulse to an input line Y1, Y2, Y3 or Y4 will induce an M.M.F. in the magnetic cores of a respective column.

The additional or inhibit input circuits or lines $I_o$ and $I_e$ are coupled to the magnetic cores in the odd and even rows respectively by the line windings 26 and 28. The fourth winding on each core is an output winding. Output windings 30, 32 are connected to odd and even output circuits $R_o$ and $R_e$ respectively.

In operation, it will be observed that a digit may be stored by selectively applying coincident pulses to the windings of a pair of cores forming a memory cell via a pair of selected X and Y input circuits. Supplying coincident pulses to either inhibitory circuit $I_o$ or $I_e$ selects a core in the pair supplied by the selected X and Y input circuits. The output circuits $R_o$ and $R_e$ are also selective as to the odd or even core of selected memory cell and are coupled to respective odd and even rows. Therefore, an output from the odd or even output circuit $R_o$ or $R_e$ indicates the shifting of the residual state of magnetism of the core in the respective odd and even row which, in turn, signals the digit being read.

In the preferred operation of the magnetic core memory system, shown in FIGURE 1, the pulse source 12 includes a selective switching arrangement for supplying current pulses to a selected X input circuit, a selected Y input circuit and either inhibitory input circuit $I_o$ or $I_e$ simultaneously. The simultaneous application of current pulses to a selected pair of cores through selected input circuits induces an M.M.F. in the cores which is the sum of the individual M.M.F.'s produced by each input winding. The shifting of the residual state of the cores 10 or a core in a pair results from the sum of the M.M.F.'s from two windings in the absence of a counter M.M.F. produced by a third inhibitory winding. In operation the electrical pulses produce an M.M.F. which is approximately one-half the amplitude necessary to shift the cores wherein the sum of two pulses in the absence of the third inhibitory pulse is capable of shifting the state of residual magnetism of a core.

In the preferred ararngement the cores in the matrix are shifted to the positive state of residual magnetism during read out by coincident positive pulses on selected coordinate input circuits X and Y and the cell or pair of cores is selected for digital storage by application of coincident negative pulses having a combined amplitude sufficient to produce an M.M.F. to shift the cores to a negative state of residual magnetism. The digit is stored according to the selection of an odd or even core of the cell by a positive inhibitory pulse on the inhibitory input circuit $I_o$ or $I_e$. The storage convention chosen is such that a stored digit 1 results from the shifting of the odd core of a cell to a negative state of residual magnetism N while the even core of the cell is retained in the positive state P; and a stored digit of zero results from shifting the even core of a cell to a negative state of residual magnetism N while the odd core of the cell remains in the positive state of residual magnetism P. The following Table I illustrates the storage convention selected for describing the preferred operation of the system where N represents the negative state of residual magnetism and P represents the positive state of residual magnetism.

*Table I*

| Stored Digit | None | 1 | 0 |
|---|---|---|---|
| Odd Core | P | N | P |
| Even Core | P | P | N |

Whenever it is desired to store a digit in a pair of cores, coincident negative "write" pulses of one-half amplitude are applied to selected coordinate input circuits X and Y. For example, assuming it was desired to store the digit 1 in an available memory cell in a column Y3 and a pair of rows X2; coincident negative pulses of one-half amplitude are applied to the coordinate input circuits X2 and Y3 while a third or additional coincident inhibitory pulse having a positive polarity would be applied to the inhibitory input circuit $I_e$. The "write" coincident current pulses of negative polarity and one-half amplitude applied to the X2 and Y3 input circuits would produce a combined negative M.M.F. in the pair of cores tending to shift both cores to the negative state of residual magnetism N in the absence of a positive coincident inhibitory pulse on one of the inhibitory input circuits $I_o$ or $I_e$. The upper core is permitted to be shifted by the negative pulses while the inhibitory pulse of positive polarity is applied to the lower or even core of the pair through the input circuit $I_e$ producing a positive counter M.M.F. to prevent shifting of the even core. The even core therefore remains in the positive state of residual magnetism.

As seen from the above described operation the storage of the digit 1 in a memory cell of column Y3 and rows X2 of the memory system, the cell for storing the digit is selected by applying coincident current pulses on the X and Y coordinates of the cell while the digit to be stored is determined by applying an inhibitory pulse to either the $I_o$ or $I_e$ circuits. The windings of the latter input circuits because of the nature of their effect, are functionally referred to as inhibitory windings. The inhibitory pulse is time coincident wth the write pulses. Therefore, whenever the digit 1 is to be stored in a selected pair of cores, a positive inhibitory pulse, having a current amplitude one-half that necessary to shift the core, is applied to the even $I_e$ inhibitory input circuit to prevent shifting of the even core of the pair of cores in the selected cell.

Whenever a zero digit is to be stored the memory cell is selected by the coordinate input circuits X and Y and the inhibitory pulse is applied to the odd inhibitory input circuit coupled to the odd rows of cores 1, 3, etc. A positive inhibitory pulse induces a positive M.M.F. opposing the negative M.M.F. induced by the X and Y coordinate input circuits to prevent shifting of the upper core in the selected cell. Since no inhibitory pulse is applied to the other core in the even row, the latter core is shifted to a negative state of residual magnetism.

In order to "read out" a cell of the memory system, positive coincident "read" pulses are applied to a pair of selected X and Y input circuits which produce a positive M.M.F. in the cores shifting one or both cores from the negative state of residual magnetism N to the positive state P. As a result of the shift in the state of magnetism of a core produced by the "read" pulse an output pulse is generated in the output winding and in the respective output circuit, e.g., read out of a stored digit 1 produces an output pulse in the circuit $R_o$ and read out of a stored digit 0 produces an output pulse in the $R_e$ output circuit. The output circuit $R_o$ is coupled to all of the cores in the odd rows by windings 30 and the output circuit $R_e$ is coupled to all of the cores in the even rows by windings 32.

Because the magnetic cores do not have perfect rectangular hysteresis characteristics, the "read" pulses applied to the input lines tend to produce output signals or noise pulses in the output circuits $R_e$ and $R_o$. In FIGURE 1 only, output windings in each row are wound in the opposite direction wherein noise pulses produced in the output windings of alternate cores are of opposite polarities, i.e., 180° phase reversal. The effect is to cancel out the noise pulses in the output circuits $R_o$ and $R_e$.

It will be observed from the above described operation that a memory cell having a core in an odd row and a core in an even row both in a single column has no digits stored therein when both cores are in a positive state of residual magnetism P. The cores in a cell that have been shifted are restored to the state P upon application of the read out pulse to the cores. No output signal is produced by positive read out pulses applied to a cell having no stored digits.

A third condition of a memory cell consisting in a pair of cores provides for possible storage of a third digit. This is illustrated in Table II in which the third digit may be stored in a cell by coincident input pulses applied to selected X and Y coordinate input circuits of the cell with no coincident inhibitory pulse applied to the $I_o$ or $I_e$ inhibitory input circuits.

*Table II*

| Stored Digit | None | 1 | 0 | 3rd Digit |
|---|---|---|---|---|
| Odd Core | P | N | P | N |
| Even Core | P | P | N | N |

This condition is shown in the table under 3rd digit where both cores are shifted to negative states of residual magnetism. The third digit is read out in the same manner as other stored digits, i.e., by application of positive read out pulses to the coordinate input circuits X and Y of the cell in which the digit is stored. The positive read out pulses will shift both cores of the cell back to the positive state of residual magnetism producing an output signal in both output circuits $R_o$ and $R_e$.

Figure 2:
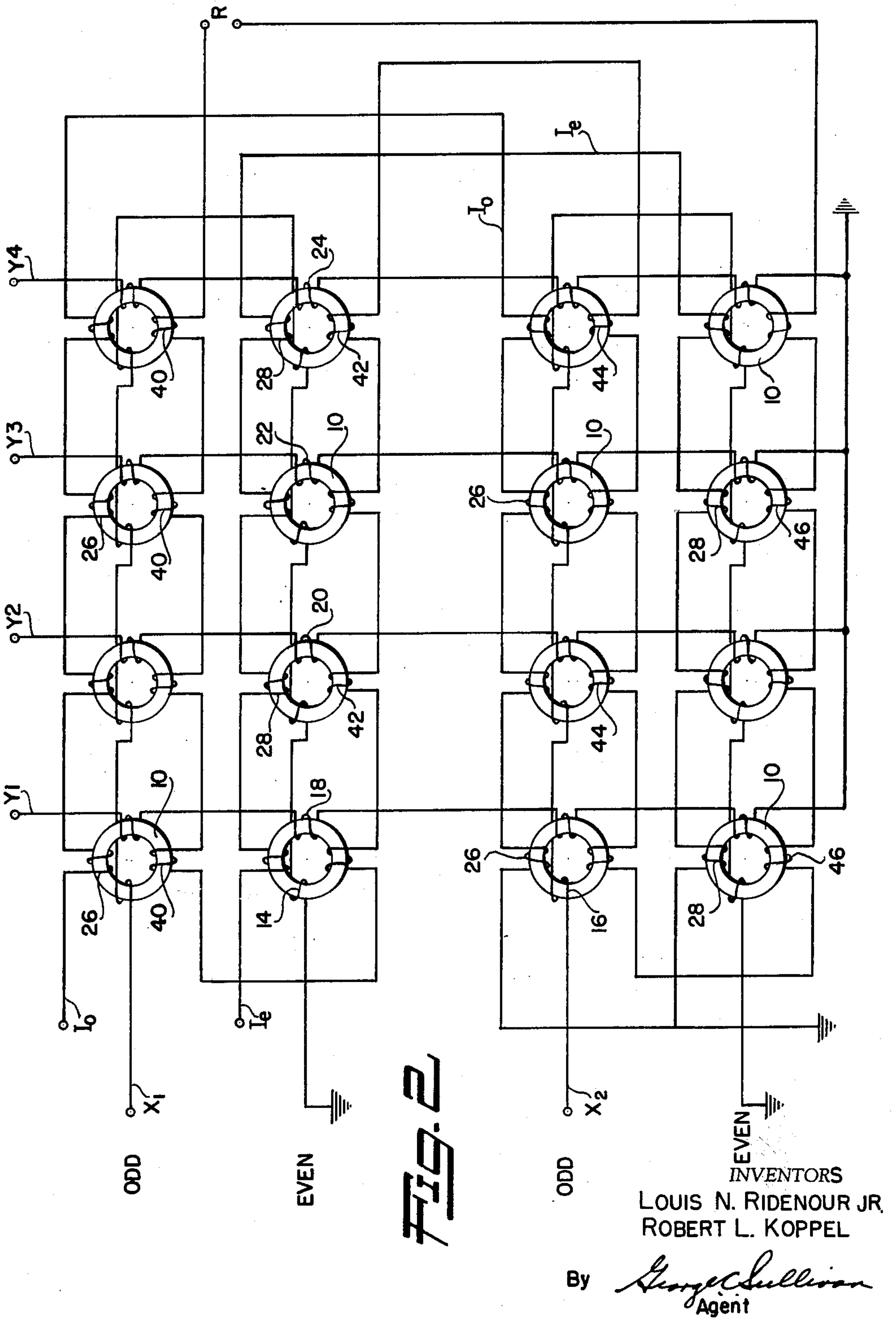
FIGURE 2 is a schematic diagram of an alternate preferred embodiment of the invention.

Referring to FIGURE 2, an alternate embodiment of the coincident current memory system has been shown which is adapted to be connected to the pulse source 12 and is otherwise identical to the system of FIGURE 1 except for the output circuit arrangement. In FIGURE 1, individual output circuits have been provided for the odd rows of cores and for the even rows of cores respectively. In FIGURE 2, a single output circuit is coupled inductively to both odd and even rows of cores in the matrix. In order to selectively detect the shifting of a core in either odd or an even row and thereby identify the digit read out of the memory cell, output windings 40 and 44 on the cores in the odd rows and output windings 42 and 46 on the cores in even rows are arranged to produce output signals of opposite polarities upon the shifting of the state of residual magnetism of a core in a respective row.

As in FIGURE 1, the read out pulses may consist of coincident pulses applied to X and Y coordinate input circuits of the cell. A core in a negative state of residual magnetism is shifted back to the positive state of residual magnetism producing a signal in the output circuit in which the polarity of the signal determines whether the digit read out is a one or a zero.

While certain preferred embodiments of the invention have been specifically disclosed it is understood that the invention is not limited thereto, as many variations will be readily apparent to those skilled in the art and the invention is to be given its broadest interpretation within the terms of the following claims.

What is claimed is:

1. In a memory system including an array of magnetic cores with generally rectangular hysteresis characteristics having both positive and negative residual states of magnetism, memory input circuit means coupled to predetermined cores for applying coincident pulses to a selected pair of cores forming a one bit memory cell to shift their common residual state of magnetism, inhibitory circuit means coupled to the cores for selectively inhibiting the shifting of one of the cores of the selected memory cell depending upon the digit being stored, and read out circuit means coupled to the cores to produce an output signal for each and every digit being read in response to the application through said input circuit means of coincident pulses shifting the cores of the memory cell to the original common state of magnetization.

2. In a memory system including a matrix of magnetic cores having both positive and negative residual states of magnetism, input circuit means coupled to the cores to selectively apply coincident read in pulses to each core of a pair of cores for shifting the state of magnetism of at least one of the pair of cores, inhibitory circuit means coupled to said cores to selectively apply inhibitory pulses coincident with said input pulses to a selected core of said pair depending on the digit being stored for preventing the shifting of the state of magnetism of the selected core, and read out circuit means coupled to each pair and detecting a change in state of the cores in a pair in response to the application of read out pulses applied through said input circuit means returning the cores to a common state of magnetism.

3. In a memory system including an array of magnetic cores having both positive and negative residual states of magnetism forming a matrix, input circuit means individually coupled to the cores in a column and to the cores in a pair of sequential rows for coupling coincident input signals to a selected memory cell including a pair of cores in a column whereby only the sum of the M.M.F. in the cores of the cell produced by said signals is sufficient to shift the state of residual magnetism of the cores in the cell, inhibiting circuit means coupled to said cores to selectively apply inhibitory pulses coincident with said input pulses to a selected core in said pair of cores depending on the digit being stored for preventing the shifting of the state of magnetism of the selected core, and read out circuit means coupled to the cores of each cell and detecting changes in the state of magnetism of the cores in the cell in response to the application of read out pulses applied through said input circuit means returning the cores in the cell to a common state of magnetism.

4. In a memory system for storing a single bit of information in a pair of magnetic cores of a matrix wherein the magnetic cores have both positive and negative residual states of magnetism, the combination comprising; input circuit means including a column line having windings on each core in a column of magnetic cores and a row line having a winding on each core of a pair of rows for selectively inducing a M.M.F. of one polarity in a pair of cores forming a cell at the intersection of a selected column and a pair of rows and inhibitory circuit means including a pair of inhibitory lines wherein each coil has windings on alternate rows of cores in each row line for selectively inducing a coincident m.m.f. of another polarity in the cores coupled to one of the inhibitory lines thereby inhibiting the shifting of the state of residual magnetism of the cores coupled to said one of the inhibitory lines depending on the digit being stored.

References Cited in the file of this patent

UNITED STATES PATENTS

| | | |
|---|---|---|
| 2,666,151 | Rajchman | Jan. 12, 1954 |
| 2,734,182 | Rajchman | Feb. 7, 1956 |
| 2,768,367 | Rajchman | Oct. 23, 1956 |

OTHER REFERENCES

Publication I: "Experiments on a Three-Core Cell for High Speed Memories," J. Raffel, S. Bradspies, IRE Convention Record, 1955, National Convention, Part 4, Computers and Information Theory, pp. 64–69.